(No Model.)
W. M. HABIRSHAW.
COVERED OR INSULATED WIRE.
No. 338,733.          Patented Mar. 30, 1886.
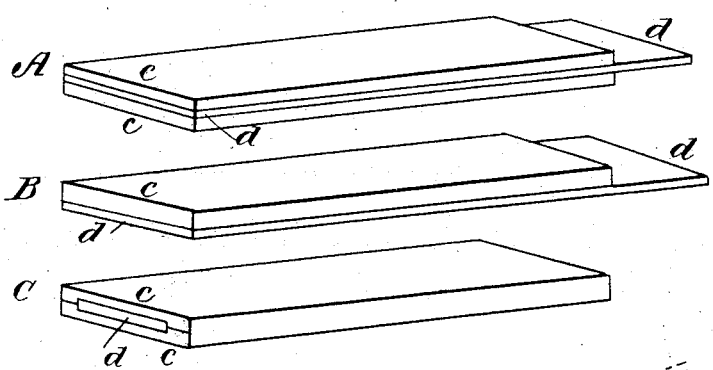
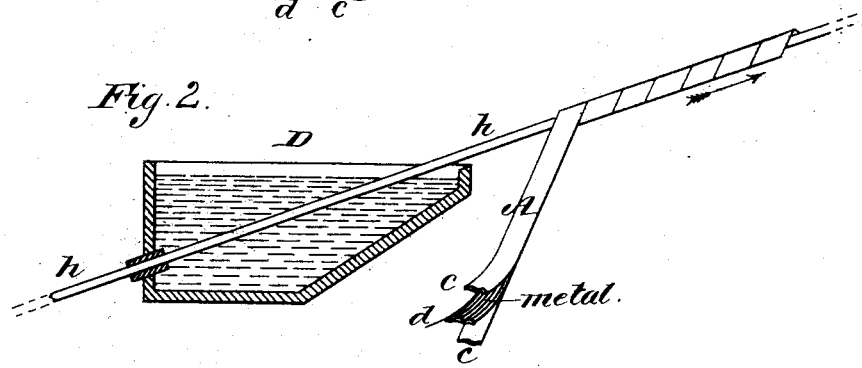
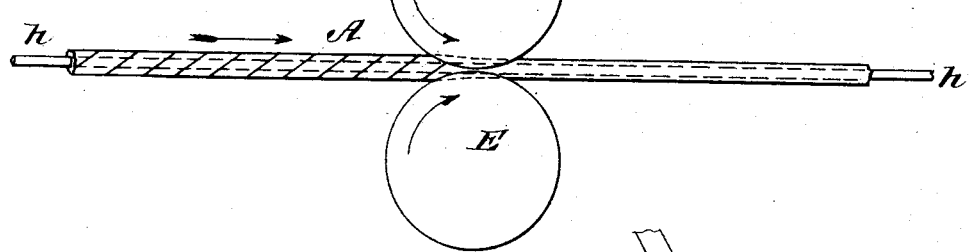
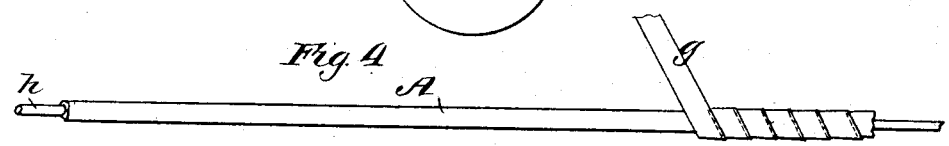
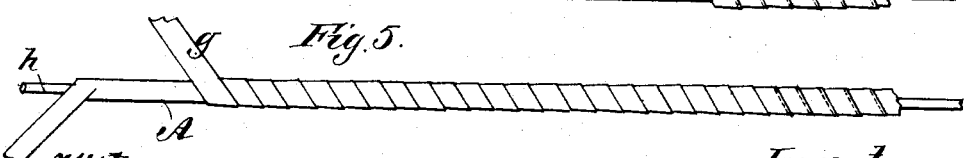
Witnesses.
John Becker
Jno. E. Gavin
Inventor.
William M. Habirshaw
by Chas. M. Higgins.
Attorney.

UNITED STATES PATENT OFFICE.

WILLIAM M. HABIRSHAW, OF NEW YORK, N. Y.

COVERED OR INSULATED WIRE.

SPECIFICATION forming part of Letters Patent No. 338,733, dated March 30, 1886.

Application filed April 9, 1885. Serial No. 161,759. (No model.)

*To all whom it may concern:*

Be it known that I, WILLIAM M. HABIRSHAW, of New York city, New York, have invented certain new and useful Improvements in Covered or Insulated Wires, of which the following is a specification.

The great object of my invention is to enable electric wires to be covered with a smooth uniform coat of vulcanized rubber without waste of insulating material, and in a manner which will insure tight joints and rapid and easy manufacture.

Heretofore wire has been covered by plastic strips of soft unvulcanized rubber wound on spirally, with the edges overlapping, and afterward vulcanized in such overlapping layers. Wire has also been covered with two longitudinal strips of plastic rubber curved around each half of the wire by rollers and united at the edges. In the latter system, in order to have the joints secure, the strips must be made much wider than the circumference of the wire, to allow the strips to be firmly rolled onto and united about the wire, and to admit of the excess being pinched or cut off at the joints, which causes a great waste of material that greatly enhances the cost of manufacture. In the spiral overlapping system, owing to the soft yielding nature of the plastic rubber strips, little or no tension can be applied thereto in the winding operation, so that the strips cannot be wound in a perfectly-tight manner, and hence loose joints and imperfect covering are therefore likely to result. Moreover, the overlapping spiral joints cause unevenness in the covering of the wire and an appreciable waste of vulcanizable material, which is objectionable.

In order to avoid some of the objections to the spiral system, it has been proposed to cover wire with successive series of fibrous tapes saturated or coated with films of soft vulcanizable rubber, each layer of tape being wound on in reverse spiral direction, with edges overlapping. This system, owing to thinness of each tape with its rubber film, will reduce the unevenness owing to the spiral overlapping joints, but the insulating-covering is in this case composed chiefly of cotton or fibrous material, whereas it is more desirable to obtain a deep substantial coating of solid rubber. Now, according to my improvement, I secure a deep substantial coating of solid vulcanized rubber with tight joints and without any waste. This I accomplish by first preparing a plastic strip of soft unvulcanized rubber of substantial thickness, which strip is mounted on a sustaining core or layer of cloth, metal, or other material, which sustains the yielding strip and prevents it from stretching or yielding longitudinally, and which strip is wound spirally about the wire, with the soft plastic rubber in contact with the wire, and with the edges of the plastic strip abutting directly together. By this means the strip can be wound tightly about the wire with all the desired tension, as the sustaining core or web resists the tension and prevents the yielding of the strip, and as the edges abut the joints will be closed tightly, and the surface of the covering will be smooth and even without protuberances, and there will be no waste whatever in the application of the strip, besides, the actual length of the joints will be much less than in the longitudinal system, thereby effecting an important improvement. After the strip is thus wound on the wire it is then passed through rollers, which compact and consolidate the rubber about the wire, causing the spiral abutting joints to be pressed firmly together and to become practically obliterated, rendering the coating integral and continuous and making the external surface perfectly smooth. After the rolling operation a tape thinly saturated or coated with an adhesive rubber film on its inner side is wound spirally about the spiral rubber coat, with its edges overlapping, after which the coatings are vulcanized on the wire, which thus completes the manufacture.

My invention therefore consists in the features here outlined, as hereinafter fully set forth.

In the drawings annexed, Figure 1 presents perspective views of three forms of plastic strips, preferably vulcanizable, with which the wire is covered according to my system. Fig. 2 shows the first operation in covering the wire, one of the strips shown in Fig. 1 being wound onto the wire. Fig. 3 shows the second operation, where the wire with the strip wound thereon is passed between grooved rollers. Fig. 4 illustrates the third operation, where the outer tape is wound over the underlying rubber coat. Fig. 5 represents the finished wire.

In practicing my invention I prepare the insulating material in long plastic strips—such as shown at A B C in Fig. 1—preferably of soft unvulcanized rubber, although other suitable insulating material may be used. The width of these strips is preferably equal to the circumference of the wire to be covered; but this width may be less or more without objection, and its thickness will be substantial, but will vary with the size of wire and the degree of insulation desired, as will be readily understood. These plastic strips are, however, prepared with a core, foundation, or sustaining web, $d$, of thin sheet metal, woven cloth, paper, or any other suitable material which is quite flexible but substantially non-yielding in a longitudinal direction, upon which core one or more layers, $c$, of soft unvulcanized rubber of substantial thickness is sustained and adhered, as shown best in Fig. 1. The rubber layer $c$ may be equal on each side of the core-web, as seen at A, the web being the same width as the rubber, or the rubber may be all on one side of the web, as seen at B, or the web may be narrower than the rubber and be embedded in the middle, as seen at C. The core-web $d$ may be made of woven fabric, or of paper or sheet metal, or any other suitable material; but I greatly prefer to make it of metal, as this will serve another important purpose, hereinafter explained. In any case I prefer to wind the strip on the wire, with the soft-rubber layer in contact with the wire, and the core either on the outside or in the middle of the strip, the latter being the best, as shown at A and C. The insulating material shown at A and B may be first formed in large sheets wound upon drums, and thence cut into narrow strips in the manner well known in the manufacture of rubber goods, and requiring no special description here. The form shown at C will require to be first cut in separate strips of the desired width, and then rolled together to make the complete strip $c\ c\ d$, as shown; hence the forms shown at A B are the simplest and most easy to manufacture, and are therefore preferable. The strips having been properly prepared, as described, the naked wire $h$ is first passed through a bath, D, of pure rubber cement, as shown in Fig. 2, and after a sufficient length of the cemented wire has passed through the air or over a heater to set the cement one of the strips A is wound spirally on the wire with the edges closely abutting, as indicated in Fig. 1. The face of the strip being soft and plastic and unvulcanized, will adhere at once to the surface of the wire, or to the rubber film thereon, and the edges of the plastic rubber abutting closely together spirally will adhere and form a smooth continuous tubular coating about the wire, free from protuberance and adhering uniformly to the wire all along its length, instead of making imperfect internal contact with the wire, and showing external protuberances, as is the case with the spirally-overlapping system heretofore used, and as the plastic strip is strengthened by an unyielding web or core, any desired tension may be put upon the strip in the winding operation to insure its being wound closely and tightly on the wire, with the edges brought into firm and adherent contact. After the plastic strip is thus wound about the wire the spiral joints will be close and even, but will be still visible, and in order to compact this coating and render the joint more perfect the coated wire is then passed between grooved rollers E, as seen in Fig. 3, the grooves being of sufficiently contracted size to insure a compression of the coating, so that the wire will issue from the rolls with the rubber tightly compacted about the wire, with the spiral joints closed firmly together and their appearance practically obliterated, rendering the coating practically a continuous integral tubing and making the exterior smooth, as shown in Fig. 3. The wire, after passing from the rollers, as in Fig. 3, may be vulcanized, and will be then fitted for use; but I prefer to further protect it before vulcanizing; hence, after the coated wire has been rolled, it is then provided with an external winding of tape, $g$, or other fibrous or sheathing material, as seen in Fig. 4, preferably coated on the interior with a thin film of a plastic vulcanizable rubber compound, or what is known as "friction-tape." This friction-tape $g$ is wound, preferably, in a reverse direction to the underlying rubber coating, and with its joints spirally overlapping, as well shown in Fig. 4. This tape will adhere firmly to the rubber and to itself in its overlapping joints, and form a strong protecting-sheathing to the inner rubber coat, as will be readily appreciated. When the outer tape is wound as described and the wire rolled upon drums, the drums are then placed in the vulcanizers and the coatings vulcanized on the wire, which thus finishes the operations and renders the wire ready for use, as indicated in Fig. 5. It will now be seen that in this system the main covering-strips of rubber compound are applied to the wire without any waste whatever, and produce at the same time an even, uniform, and continuous coating, without protuberances and with very close and perfect joints, and, moreover, the actual length of the joints will be about one-third less than in the longitudinal system, where two strips are united on opposite sides of the wire, and hence much more economical and much more perfect work is produced, for not only is material saved and work expedited, but a more perfect internal contact and external form secured, and the length of joints is greatly reduced, which are most important advantages. It will be further seen that in case the strips are prepared with metallic cores or webs $d$, as described, not only will the rubber be greatly strengthened and enabled to be wound tightly about the wire, but this metal core will form a distinct conductor within the covering parallel with the central wire, and which may be used for a return-conductor, or for other purposes which will suggest themselves to the electrician. For this latter purpose I therefore prefer to have the metal core-strip $d$ of such thickness as will equal the conductivity of the wire $h$.

What I claim as my invention is—

1. The improvement in the art of covering wire herein described, consisting in winding a plastic vulcanizable strip of substantial thickness spirally about the wire, with its edges abutting, and causing said abutting edges to adhere about the wire.

2. The described mode of coating wire, consisting in preparing strips of plastic insulating material of substantial thickness mounted on a sustaining core or web of longitudinally-unyielding material, and then winding said strips with tension spirally about the wire, with its edges tightly abutting and adhering, substantiallly as set forth.

3. The described mode of coating wire, consisting in winding a plastic vulcanizable strip of substantial thickness spirally about the wire, with its edges abutting, and subsequently vulcanizing said strip upon the wire.

4. The described process of coating wire, consisting in first winding a plastic strip spirally about the wire, with its edges abutting, and then rolling said covered strip to compact the same and close and perfect the abutting joints of the strip.

5. The process of coating wire consisting in first winding a plastic strip spirally about the wire, with its edges abutting, subsequently rolling the same, and finally overwinding the same with a sheathing strip or tape, with its edges spirally overlapping.

6. The process of coating wire consisting in winding a plastic vulcanizable strip spirally about the wire, with its edges abutting, then rolling the same, subsequently overwinding the same with a sheathing tape or strip, and finally vulcanizing the same.

7. The process of coating wire consisting in first coating the wire with an inner coat of plastic rubber wound on spirally, with its edges abutting, then rolling the same, and afterward overwinding the said coat with a sheathing-tape wound at a reverse inclination to the inner coat, with its edges overlapping, and finally vulcanizing the said coats.

8. The improvement in the art of covering wire consisting in preparing plastic insulating-strips with an embedded sustaining core or web of metal, and winding said strips spirally about the wire.

9. The improvement in the art of covering wire consisting in preparing strips of plastic vulcanizable rubber mounted on a strengthening core or web of metal and winding the same spirally about the wire, with the edges of the rubber abutting and the metal out of contact with the wire, substantially as and for the purpose set forth.

WILLIAM M. HABIRSHAW.

Witnesses:
JNO. E. GAVIN,
CHAS. M. HIGGINS.